United States Patent
Wu et al.

(10) Patent No.: US 7,206,608 B1
(45) Date of Patent: Apr. 17, 2007

(54) SYSTEM AND METHOD FOR SCHEDULING TRANSMISSION FROM MULTIPLE-BEAM TRANSMITTERS

(75) Inventors: Jianming Wu, Kanata (CA); Peiying Zhu, Kanata (CA); Wen Tong, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 245 days.

(21) Appl. No.: 10/736,501

(22) Filed: Dec. 17, 2003

Related U.S. Application Data

(60) Provisional application No. 60/517,637, filed on Nov. 6, 2003.

(51) Int. Cl.
*H04M 1/00* (2006.01)
*H04Q 7/20* (2006.01)
*H04B 7/185* (2006.01)
*H01Q 3/00* (2006.01)

(52) U.S. Cl. .................. 455/562.1; 455/450; 455/451; 455/452.1; 455/452.2; 342/354; 342/372

(58) Field of Classification Search ............ 455/562.1, 455/450–452.2; 342/354, 372
See application file for complete search history.

(56) References Cited

U.S. PATENT DOCUMENTS

| | | | | |
|---|---|---|---|---|
| 6,006,110 | A * | 12/1999 | Raleigh ....................... | 455/561 |
| 6,091,788 | A * | 7/2000 | Keskitalo et al. ............ | 375/347 |
| 6,330,460 | B1 * | 12/2001 | Wong et al. ............. | 455/562.1 |
| 6,597,668 | B1 * | 7/2003 | Schafer et al. .............. | 370/280 |
| 6,850,502 | B1 * | 2/2005 | Kagan et al. ............... | 370/330 |
| 6,895,258 | B1 * | 5/2005 | Scherzer et al. ......... | 455/562.1 |
| 2003/0125040 | A1 * | 7/2003 | Walton et al. .............. | 455/454 |
| 2004/0063438 | A1 * | 4/2004 | Hsu et al. ................. | 455/452.1 |
| 2004/0095907 | A1 * | 5/2004 | Agee et al. ................. | 370/334 |
| 2004/0121810 | A1 * | 6/2004 | Goransson et al. ...... | 455/562.1 |

OTHER PUBLICATIONS

Erceg, V.; Hari, K.V.S.; Smith, M.S.; Baum, D.S.; Sheikh, K.P.; Tappenden, C.; Costa, J.M.; Bushue, C.; Sarajedini, A.; Schwartz, R.; Branlund, D.; Kaitz, T.; Trinkwon, D.; Channel Models for Fixed Wireless Applications; Jul. 17, 2001; pp. 1-34.

Donald Archer for the Electromagnetic Systems Division; Lens-Fed Multiple Beam Arrays; pp. 1-9.

Rotman, W.; Turner, R.F.; Wide-Angle Microwave Lens for Line Source Applications; IEEE Transactions on Antennas and Propagation; pp. 623-632.

Raytheon E-Systems; Base Station Antenna; Features and Benefits.

Raytheon E-Systems; Cellular Panel Antenna; Features and Benefits.

* cited by examiner

*Primary Examiner*—William Trost
*Assistant Examiner*—Ariel Balaoing

(57) ABSTRACT

Systems and methods for scheduling transmissions from multi-beam transmitters to sets of receivers are provided. An angle of departure is determined for each of the receivers, and the transmissions to the receivers is then scheduled on the basis of the separation between the angles of departure between the receivers. For example, a constraint may be imposed that no two receivers having an angle of departure separated by less than a first minimum will be scheduled during an even scheduling interfold. Some implementations include a prioritized scheduling system in which high priority receivers are scheduled according to a performance metric subject to the angle departure constraint, and subsequently low priority receivers as scheduled only subject to the angle departure constraint.

26 Claims, 9 Drawing Sheets

SYSTEM AND METHOD FOR SCHEDULING TRANSMISSION FROM MULTIPLE-BEAM TRANSMITTERS

RELATED APPLICATIONS

This application claims the benefit of U.S. Provisional Application No. 60/517,637 filed Nov. 6, 2003.

FIELD OF THE INVENTION

The invention relates to signal transmission over multiple partially interfering beams.

BACKGROUND OF THE INVENTION

Systems employing wireless to the network (WTTN) can now deliver the same data rate as fiber to the network (FTTN) solutions. These systems provide point to multi-point connections at giga-bit rate levels. However, an advantage of the wireless approach to the fiber approach is that WTTN can achieve a cost of approximately one quarter that of FTTN.

In one example system implementation, a network access point (NAP) is provided which serves a set of local access points (LAP) via wireless point-to-point connection. Each local access point in turn provides service to a localized set of customers. A challenge for WTTN is to provide constant bit rate transmission to each LAP. One reason for this is that wireless links are always environment dependent.

Various multi-beam transmission schemes exist. These include fixed beam methods, and adaptive beam forming methods.

With the fixed beam method, a set of fixed beams is used to increase simultaneous transmission receivers, and to achieve high data rate transmission with a certain number of beams, M. An example with M=18 is illustrated in FIG. 1. The fixed beam method can be employed for either transmission or reception. To achieve a good performance with a fixed beam system, the best beam is selected for each receiver in both the transmit and receive directions, resulting in the highest signal-to-noise ratio (SNR) for each receiver. The fixed beams can be generated, for example, by a Rotman lens. The beam pattern of FIG. 1 is generated by a sectorized transmitter having three sectors. Typically, the beams generated at the center of the sector will be the strongest while the beams closer to the edge of the sector will have less strength.

In the fixed beam method described with reference to FIG. 1, there are two problems. The first problem is that the number of receivers assigned into each beam is not balanced resulting in unequal throughput for each receiver. The second problem occurs when a receiver is located near the boundary of two beams. This results in a dead spot where the receiver cannot be served with a required minimum data rate.

The adaptive beamforming technique uses a spatial processing with an antenna array, requiring an optimum combining so as to improve system performance. The optimum beamforming combining performed by an adaptive array antenna optimizes the beamformer response so that the output contains minimum contributions due to noise and signal arriving from directions other than the desired signal direction. An example beamforming array antenna with 3-sectorization each employing six antenna elements with half wavelength spacing is illustrated in FIG. 3. The problem for adaptive beamforming is that the beams formed by the antenna array could collide with each other when two receivers are closely located, resulting an extremely low SNR in receiver.

Typically for either of the above methods, a random or round robin scheduling method is employed to determine which receivers to schedule in a given transmission interval. The conventional round robin or random scheduling solutions fail to meet guaranteed CBR (constant bit rate) requirements. It would be desirable to have scheduling methods which improve upon the performance of simple round robin or random scheduling.

SUMMARY OF THE INVENTION

According to one broad aspect, the invention provides a method of scheduling transmissions from a multi-beam transmitter to a plurality of receivers comprising: determining an angle of departure for each of the plurality of receivers; scheduling transmission to receivers based upon separation between angles of departure between scheduled receivers.

In some embodiments, a minimum angle of separation constraint is imposed that requires any two receivers which are scheduled during a given scheduling interval to have angles of departure separated by at least a first minimum angle of separation.

In some embodiments, the receivers are scheduled by: in sequence, selecting a receiver as a function of a performance metric, subject to said constraint.

In some embodiments, the performance metric is cumulative throughput, and wherein in sequence, selecting a receiver as a function of the performance metric comprises: a) determining a receiver with a lowest cumulative throughput and scheduling that receiver; b) determining a receiver with a next lowest cumulative throughput and scheduling that receiver unless that receiver has an angle of separation with a previously scheduled receiver which does not satisfy the constraint; c) repeating step b) for additional receivers.

In some embodiments, the receivers are scheduled by, in sequence: a) scheduling a first receiver; b) determining a receiver of remaining receivers which has a largest angle of separation with previously scheduled receivers and scheduling that receiver subject to the constraint.

In some embodiments, the method further comprises each scheduling interval: logically dividing the receivers into low priority receivers and high priority receivers; scheduling the low priority receivers before scheduling the high priority receivers.

In some embodiments, the method further comprises each scheduling interval: logically dividing the receivers according to at least three groups each having a respective priority ranging from lowest to highest; scheduling the groups of receivers in decreasing order of priority.

In some embodiments, scheduling the high priority receivers comprises: a) determining a high priority receiver with a poorest performance metric and scheduling that receiver; b) determining a high priority receiver with a next poorest performance metric and scheduling that high priority receiver unless that high priority receiver has a minimum angle of separation with a previously scheduled receiver which does not satisfy the constraint; and wherein scheduling the low priority receivers comprises: c) determining a low priority receiver which has a largest angle of separation with previously scheduled receivers and scheduling that user subject to the constraint.

In some embodiments, the method further comprises repeating step b) until there are no further high priority receivers that satisfy the constraints.

In some embodiments, the method further comprises repeating d) for further low priority receivers until no further low priority receiver satisfies the constraint or until there is no further capacity to schedule.

In some embodiments, the method applies to each of a plurality of sectors being serviced by a wireless network node.

In some embodiments, the wireless network node is a network access point, and each receiver is a local access point.

In some embodiments, the method further comprises determining if there is any pair of receivers of different sectors which have angles of departure separated by less than a second minimum angle of separation; for each such pair of receivers, eliminating one of the pair of receivers from consideration for scheduling.

In some embodiments, the one of the pair of receivers eliminated from consideration is selected on the basis of cumulative throughput, with the receiver having higher cumulative throughput being eliminated.

In some embodiments, the method further comprises at a beginning of scheduling for each scheduling interval, eliminating at least one receiver from consideration for scheduling.

In some embodiments, the method applies to each of a plurality of sectors being serviced by a wireless network node, wherein the performance metric comprises cumulative throughput, the method further comprising: determining if there is any pair of receivers of different sectors which have angles of departure separated by less than a second minimum angle of separation; for each such pair of users, eliminating one of the pair of receivers from consideration for scheduling on the basis of cumulative throughput, with the higher cumulative throughput receiver of the pair being eliminated.

In some embodiments, the multi-beam transmitter comprises an adaptive beamforming transmitter, the method further comprising performing adaptive beamforming for the scheduled receivers.

In some embodiments, the multi-beam transmitter generates a plurality of substantially fixed beams which are individually directable, the method further comprising directing each of the statically shaped beams.

In some embodiments, the multi-beam transmitter is a fixed multi-beam transmitter which generates an array of beams which are collectively steerable to a plurality of fixed rotational states, and individually activatable.

In some embodiments, a transmitter is adapted to implement a method as summarized above.

In some embodiments, a transmitter is provided as summarized above in the form of a network access point.

In some embodiments, the system is provided which comprises a wireless network node adapted to implement a method as summarized above and a plurality of receivers.

In some embodiments, the wireless network node is a network access point, and each receiver is a local access point.

In some embodiments, the invention provides a computer readable medium having instructions stored thereon for implementing a method as summarized above.

In some embodiments, the transmitter further comprises a multi-beam antenna; a scheduler adapted to determine an angle of departure for each of a plurality of receivers and to schedule transmission to each receiver on an appropriate beam of the multi-beam antenna based upon separation between angles of departure between scheduled receivers.

In some embodiments, a minimum angle of separation constraint is imposed that requires any two receivers which are scheduled to have during a given scheduling interval angles of departure separated by at least a first minimum angle of separation.

In some embodiments, the scheduler is adapted to determine an angle of departure for each angle by receiving an angle of arrival information from each receiver, and deriving the angle of departure from the angle of arrival information.

In some embodiments, the multi-beam antenna is an adaptive beamforming antenna.

In some embodiments, the multi-beam antenna is a fixed steering beam antenna.

In some embodiments, the multi-beam antenna generates a plurality of beams having substantially fixed shapes which are individually directable.

In some embodiments, a transmitter as summarized above forms a network access point.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

System performance with adaptive beamforming depends strongly upon a scheduler under multi-receiver conditions. This is because the adaptive beamformer has no knowledge to separate the receivers in space that may be very close each other. Receivers that are close each other and are scheduled at the same time could cause serious interference between each other. This in turn can have an effect on data transmission rates, and in particular may result in some receivers not achieving a specified minimum data transmission rate. To avoid such impacts on data transmission, a system and method for scheduling is provided which assigns such receivers in different time slots so as to improve the system capacity.

A method of scheduling transmission by a multi-beam transmitter to a plurality of receivers will now be described with reference to FIG. 4, which is a flowchart of a first method provided by an embodiment of the invention. The method begins at step 4-1 with the determination of angles of departure for each receiver. The angle of departure is the angle of transmission from the transmitter to the receiver from a defined reference. This can be determined using any suitable method. In one embodiment, each receiver measures an angle of arrival and feeds this back to the transmitter, and the angle of departure is determined from the feed back information. The angle of separation between two receivers is defined as the difference in angle of departure from the transmitter to the first of the two receivers and the angle of departure from the transmitter to the second of the two receivers. These angles of separation can be determined for all pairs of receivers initially. In a preferred embodiment, the angles of separation are determined on an as needed basis. This can typically be done at the transmitter, for example on the basis of known angles from a predetermined reference angle. At step 4-2, receivers are then scheduled for a given transmission period based on the angles of separation between receivers. In a preferred embodiment, this involves scheduling all users subject to a minimum angle of separation constraint. This means that of the set of possible receivers to be scheduled, a subset is selected which satisfies the constraint that any two receivers in the subset are separated by an angle of separation which is greater than the minimum angle of separation. Advantageously, by imposing this minimum angle of separation constraint, the amount of interference between pairs of receivers will be lower, and as a result the overall throughput will be improved.

Figure 4:
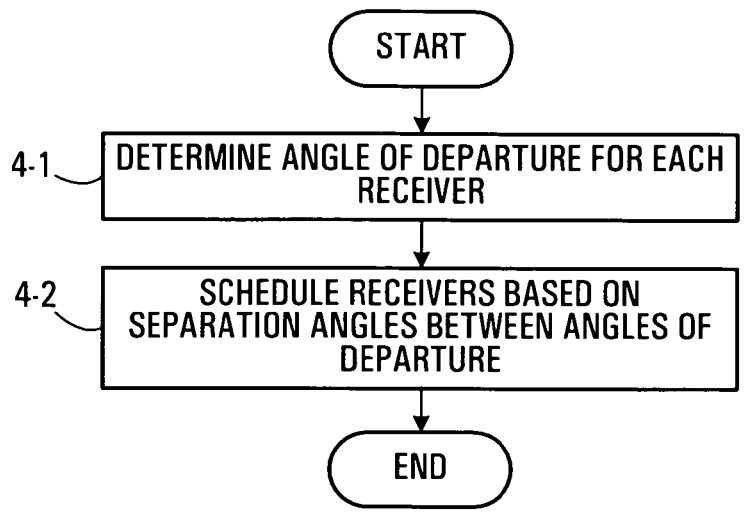
FIG. 4 is a flowchart of a first method of scheduling receivers in a multi-beam transmitter provided by an embodiment of the invention.

It is noted that for sectorized transmitters, the method of FIG. 4 could be implemented for each sector.

Another method of scheduling receivers provided by another embodiment of the invention will now be described with reference to FIG. 5. In this embodiment, the method begins with the dividing of receivers into a low priority group and a high priority group. This can be done, for example, on the basis of the current cumulative throughput for the receivers although other performance metrics may be used instead. In a preferred embodiment, the high priority group is selected to be all receivers that do not currently have a specified minimum throughput, and the low priority group consists of all remaining receivers. At step 5-2, the high priority receivers are then scheduled, again subject to an angle of separation constraint, preferably the minimum angle of separation discussed previously with respect to the embodiment of FIG. 4. After the high priority group of receivers is scheduled in step 5-2, the low priority group of receivers is then scheduled in step 5-3, again subject to an angle of separation constraint, preferably the minimum angle of separation constraint. This approach provides the benefits of the method of FIG. 4, but has the added benefit of increased fairness since the high priority receivers are scheduled before the low priority receivers. It is noted that in this embodiment and the previous embodiment, the number of receivers that can be scheduled may also be subject to constraints such as capacity, available power, and the number of beams available.

Figure 5:
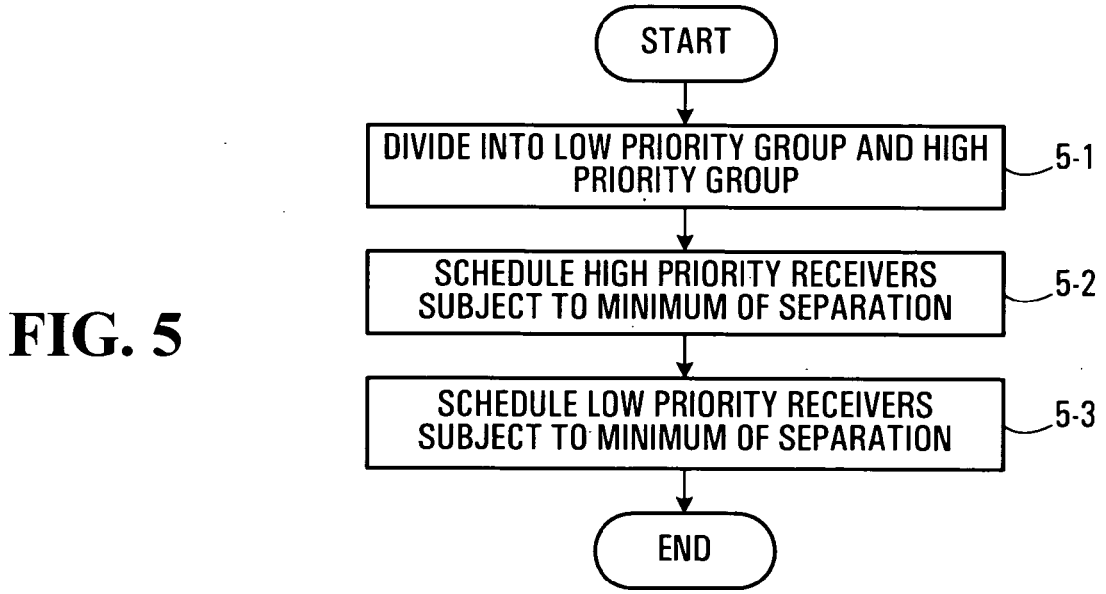
FIG. 5 is a flowchart of a second method of scheduling receivers in a multi-beam transmitter provided by an embodiment of the invention.
Figure 6:
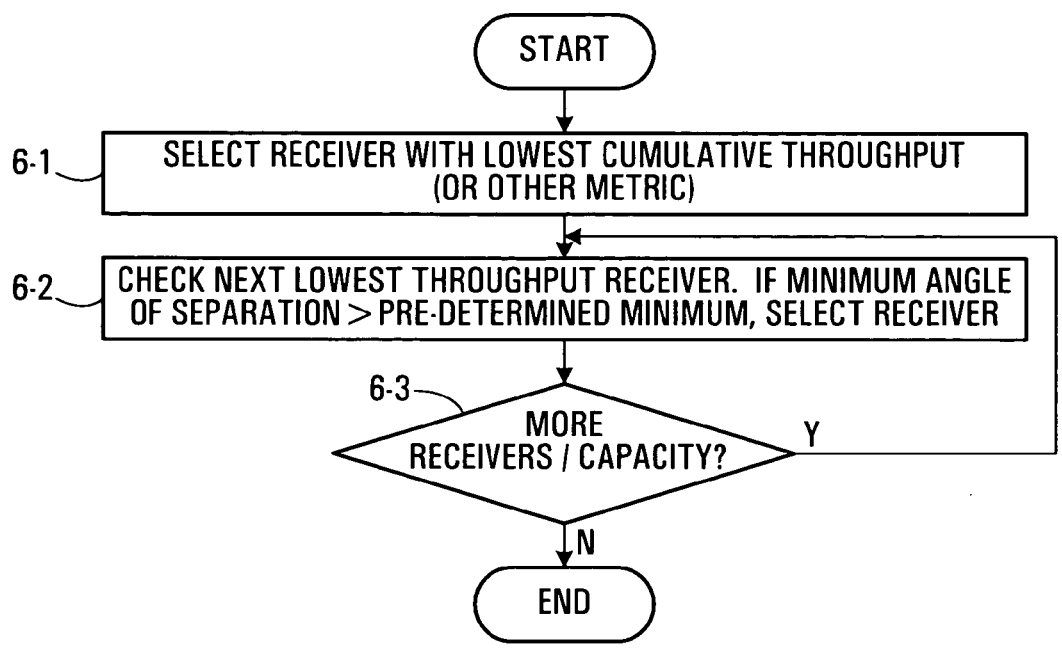
FIG. 6 is a flowchart of a method of scheduling receivers, for example high priority receivers, provided by another embodiment of the invention.

Referring now to FIG. 6, shown is a flowchart of a preferred method of scheduling a group of receivers, for example the high priority receivers (step 5-2 of FIG. 5). This method begins at step 6-1 with the selection of the receiver in the group with the lowest throughput (or equivalently the receiver having the poorest (lowest/highest) performance metric which puts that receiver in the most urgent need to be scheduled). This selected receiver is then included for scheduling. Next, at step 6-2 the receiver in the group with the next lowest throughput (or other metric) is considered for scheduling. If the minimum angle of separation between that receiver all previously selected receivers is larger than the specified minimum, then the receiver is selected. Otherwise, that receiver is not selected. If, at step 6-3 it is determined that there are more receivers to schedule in the high priority group, and there is still capacity to schedule more receivers, then steps 6-2 and 6-3 are repeated, until there are no more receivers in the group. It can be seen that in this method, receivers in the group are scheduled in order of throughput, but subject to the minimum angle of separation constraint. In other embodiments, other methods of scheduling the high priority group of receivers can alternatively be employed so long as they are scheduled subject as a function of angle of separation.

Figure 7:
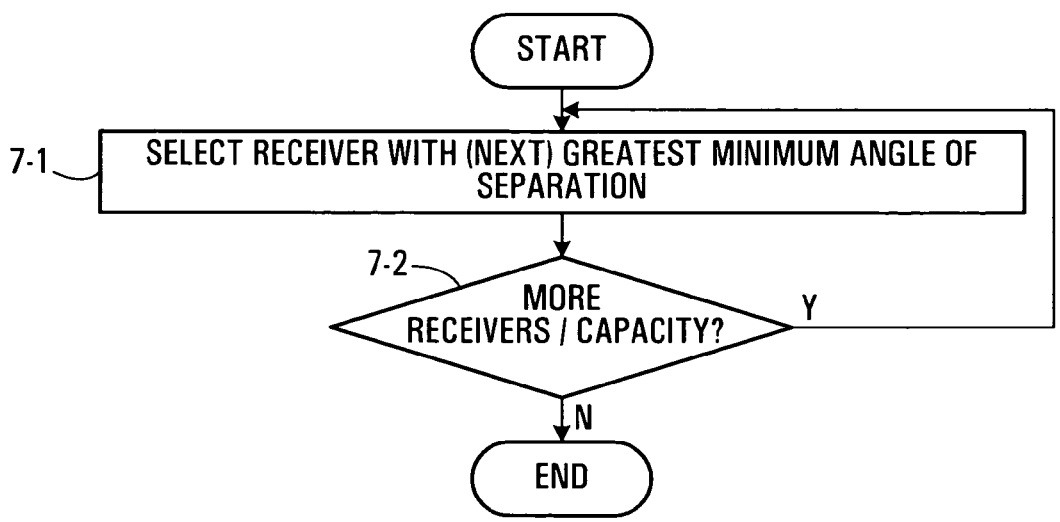
FIG. 7 is a flowchart of another method of scheduling receivers, for example low priority receivers, provided by another embodiment of the invention.

Referring now to FIG. 7, shown is a flowchart of a preferred method of scheduling a group of receivers, for example the low priority receivers, this being an example implementation of step 5-3 of FIG. 5. This begins at step 7-1 with selecting the receiver from the group having the maximum minimum angle of separation between itself and the previously selected receivers. Each potential receiver has an angle of separation between each already selected receiver. The minimum of these angles of separation is the minimum angle of separation for that receiver. One of the potential receivers will have the maximum minimum angle of separation and that is the receiver that is selected. Then, if there are more receivers to schedule and there is still capacity, as indicated at step 7-2, steps 7-1 and 7-2 are repeated to select further receivers. It can be seen that the method of FIG. 7 involves selecting receivers solely on the basis of angle of separation. No consideration is made as to the amount of throughput that receivers in the low priority group have achieved thus far. It is to be understood that in other embodiments other methods of scheduling the low priority receivers can alternatively be employed within the scope of the invention, so long as they are scheduled as a function of the angle of separation.

In one embodiment, the method of FIG. 6 is employed first for high priority receivers, and then the method of FIG. 7 is employed for low priority receivers.

An example of how to integrate together the methods of FIGS. 6 and 7 follows. Let Ns be the number of simultaneous users predetermined for transmission, and let Na be the number of active users scheduled thus far from the high priority group. In one embodiment, the scheduling of further users from the high priority group can proceed as follows:

if Na<Ns, keep scheduling for the high priority receivers, if there are anymore;

if Na=Ns, stop scheduling for the high priority receivers and stop scheduling for that slot;

if Na<Ns, but there are no receivers left in the high priority group, stop scheduling high priority receivers and use the remaining space (Ns−Na) for scheduling low priority receivers.

In other words, given the capacity for scheduling, as many high priority receivers are scheduled as possible, and any left over capacity is then made available for scheduling low priority receivers.

Figure 8:
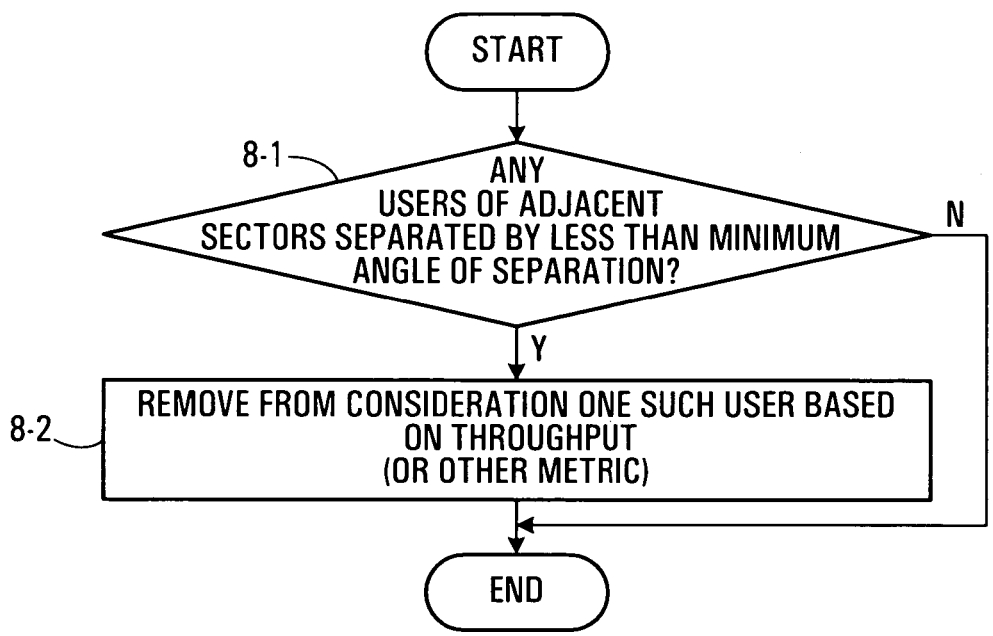
FIG. 8 is a flowchart of a method of inter-sector scheduling provided by an embodiment of the invention.

The methods thus described are applicable on a per sector basis in the event there are multiple sectors. Preferably, in a multi-sector embodiment, the additional steps of FIG. 8 are also employed in order to minimize interference between receivers that are located near the boundary of adjacent sectors. The method of FIG. 8 begins at step 8-1 with determining if there are any receivers of different sectors that are separated by less than the minimum angle of separation (or fail some other angle of separation constraint). If not, then nothing further needs to be done in order to handle intra-sector scheduling. On the other hand, if there are receivers of different sectors which are separated by less than the minimum angle of separation, then at step 8-2 for each pair of such receivers one of the receivers is removed from consideration during the remainder of the scheduling exercise. The receiver removed might be selected on the basis of throughput for example with the higher throughput receiver of the pair being removed from further consideration. Other metrics or bases for removing one of the two receivers could alternatively be employed in other embodiments. In embodiments featuring the steps of FIG. 8, preferably these steps are performed before the remainder of the scheduling.

Figure 9:
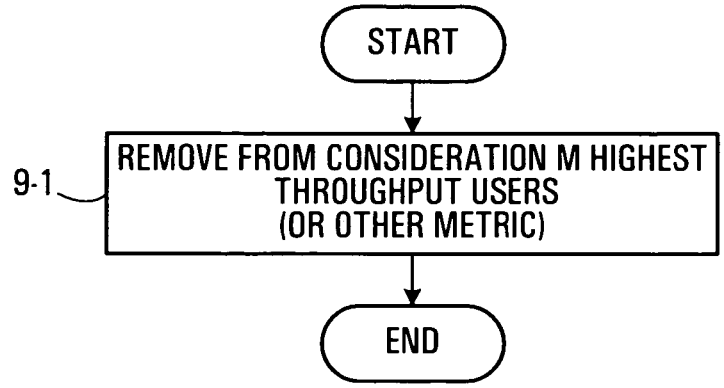
FIG. 9 is a flowchart of another embodiment of a scheduling method for a multi-beam transmitter.

In another embodiment of the invention, the step of FIG. 9 is executed prior to the start of scheduling. This involves at step 9-1 the removal from consideration the M highest throughput receivers, or M receivers selected according to some other metric, where M is an application specific parameter. Thus, at the very start of the process some subset of the receivers which are currently receiving the best performance are removed from being considered for scheduling during that scheduling interval. This is another measure introduced to ensure fairness in the scheduling of receivers.

Mathematical Analysis

A mathematical analysis of the above solution will now be presented. It is to be clearly understood that this analysis is for the purpose of further illustrating concepts of various embodiments. This is a non-limiting analysis. In mathematically modelling the optimization problem, several parameters are defined as follows:

1. N is the number of users in each cell.

2. n is the n-th time slot.

3. $\xi_k(n)$ is a flag for the k-th user in the n-th time slot. When $\xi_k(n)=1$, the k-th user is active user, and $\xi_k(n)=0$, otherwise.

4. $R_k[\xi_1(n),\xi_2(n),\ldots,\xi_N(n)]$ is the instantaneous transmission data rate depending on the following two factors:
   a) Active user locations.
   b) Array antenna layout and its number of elements for adaptive beamforming.

5. $\Pi_k(n)$ is the average cumulated throughput from slot-1 to slot-n for the k-th user.

6. $\Pi_{th}$ is the predetermined target throughput.

The optimization for the scheduler is concerned with the maximization of the total instantaneous transmission data rate while always keeping the average cumulated throughput larger or equal to the predetermined target throughput. Thus, the optimization problem has the following form $$\max_{\xi_1(n),\xi_2(n),\cdots,\xi_N(n)} \sum_{k=1}^{N} R_k[\xi_1(n), \xi_2(n), \cdots, \xi_N(n)] \cdot \xi_k(n)$$

subject to $\Pi_k(n) \geq \Pi_{th}$, $k=1,2,\ldots,N$ $$\Pi_k(n) = \frac{1}{n}\sum_{k=1}^{n} R_k[\xi_1(n), \xi_2(n), \cdots, \xi_N(n)] \cdot \xi_k(n).$$

The above equation shows a very complicated nonlinear optimization problem, to which a closed form solution has not been found. While a closed form solution cannot be found, it is possible that using an exhaustive search, users can be scheduled in a manner which will satisfy the optimization problem. This would be an alternative approach to scheduling users subject to the minimum angle of separation constraint. It is noted however for a large number of users, it could be fairly time consuming to conduct an exhaustive search.

The solutions described in detail above are in fact suboptimum solutions in the sense that they may not give exactly the same answer as the solution to the above discussed optimization problem.

In order to obtain the suboptimum solution, it is assumed that the number of antenna elements is given. This gives the corresponding beam-width and equivalently provides the predetermined minimum user separation angle, $\Delta_{min}$, if a certain signal-to-noise ratio (SNR) is predetermined. The optimum solution for the smart scheduler is to maximize the number of selected active users (LAPs), $$N_s^{(max)} \quad (N_s^{(max)} \leq N),$$

whose angles of separation should be large enough so as to keep the interference as small as possible.

Minimum separation angle, $$\Delta_{min}^{(k)},$$

for LAP-k is defined as a minimum angle selected from all angles of separation between the k-th LAP and the all candidate LAPs. For example, assuming that there are N LAPs for active LAP candidates, we may compare the angles of separation for LAP-k, say $\Delta_{k,i}$, where $k \neq i$ and $i=1,2,\ldots,N$, and then find smallest one for $$\Delta_{min}^{(k)}.$$

Maximum minimum separation angle, $$\Delta_{min}^{(max)}$$

is defined as a maximum angle of separation selected from all minimum separation angles, $$\Delta_{min}^{(k)},$$

among the all candidate LAPs, where $k=1,2,\ldots,N$.

Figure 10:
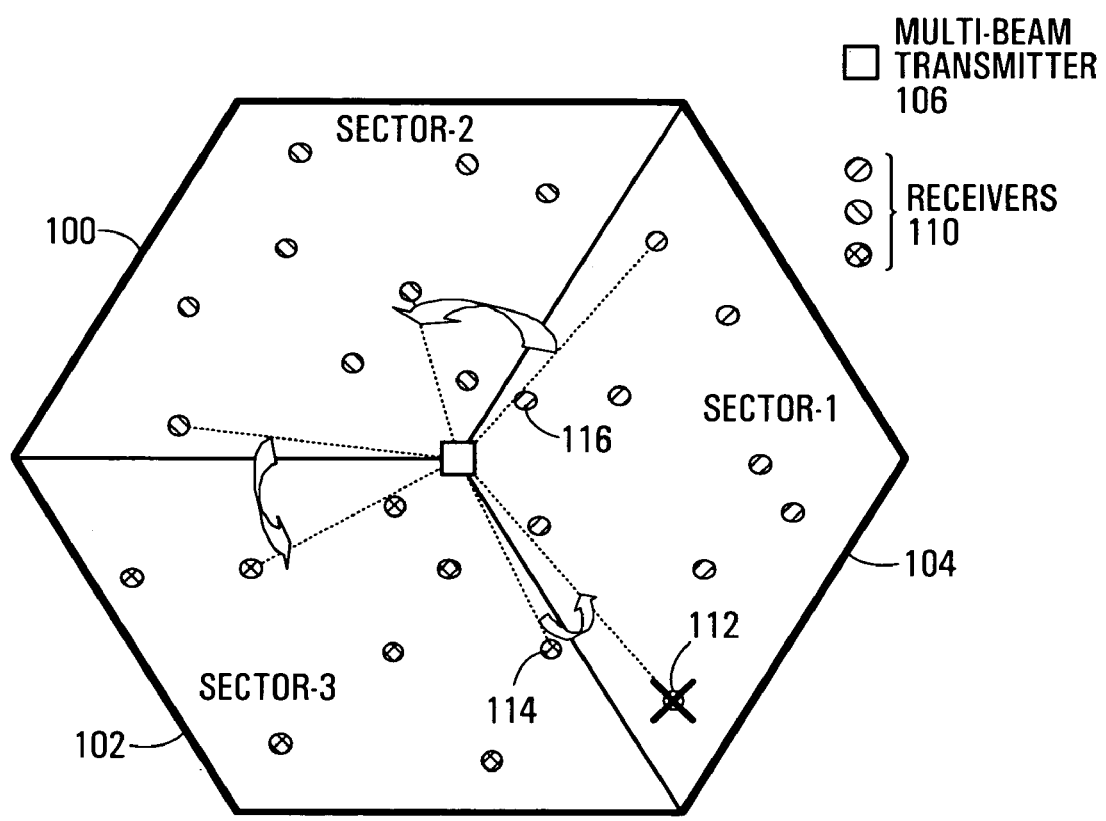
FIG. 10 is a diagram of a sector layout for a multi-beam transmitter.

To reduce the interference from beamforming side-lobe, a sectorization structure is considered as illustrated in the example of FIG. 10. Shown is an example distribution of receivers 110 within three sectors 100,102,104 of a multi-beam transmitter 106. For the sake of simplicity, the beam-forming weights are calculated in each sector individually. This could result in some interference between LAPs particularly in sector boundary. To avoid this to happen, a pre-scheduling between sectors can be employed (called inter-sector scheduling) to disable the LAPs who are close each other. Another intra-sector scheduling performed after inter-sector scheduling assigns the active LAPs based on the following procedure:

1. Set the predetermined maximum number of simultaneous transmission LAPs to be $$N_s^{(max)},$$

where $$N_s^{(max)} \leq N.$$

2. The LAPs whose throughputs are all lower than the predetermined target throughput, $\Pi_{th}$, are considered in a high priority LAPs group for active LAP assignment, and the remaining LAPs with higher throughputs are in a low priority LAPs group. The number of LAPs in the high priority group should be less or equal to $$N_s^{(max)}.$$

3. Assign the LAPs with lower throughput in the high priority group to be active LAPs subject to checking all the separation angles, which must be larger than the predetermined minimum separation angle, $\Delta_{min}$.

4. The LAPs with maximum minimum angles of separation in the low priority group are assigned to be active LAPs until reaching the number of predetermined simultaneous transmission LAPs, $$N_s^{(max)},$$

or until no candidate LAPs are left.

It is noted that the scheduling is performed at every time slot in each individual sector.

Figure 11:
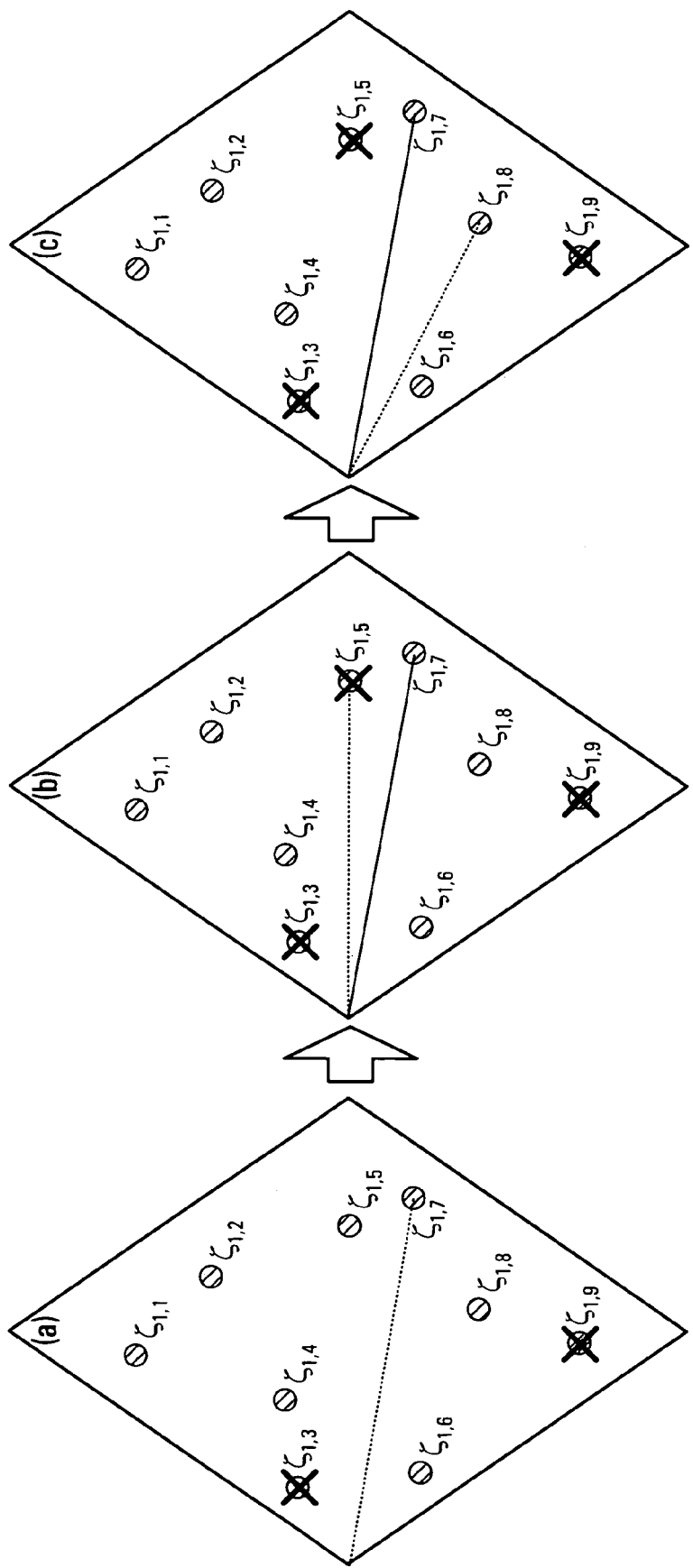
FIGS. 11 and 12 are diagrammatic examples of employing an embodiment of the invention to schedule receivers in the sector layout of FIG. 10.
Figure 12:
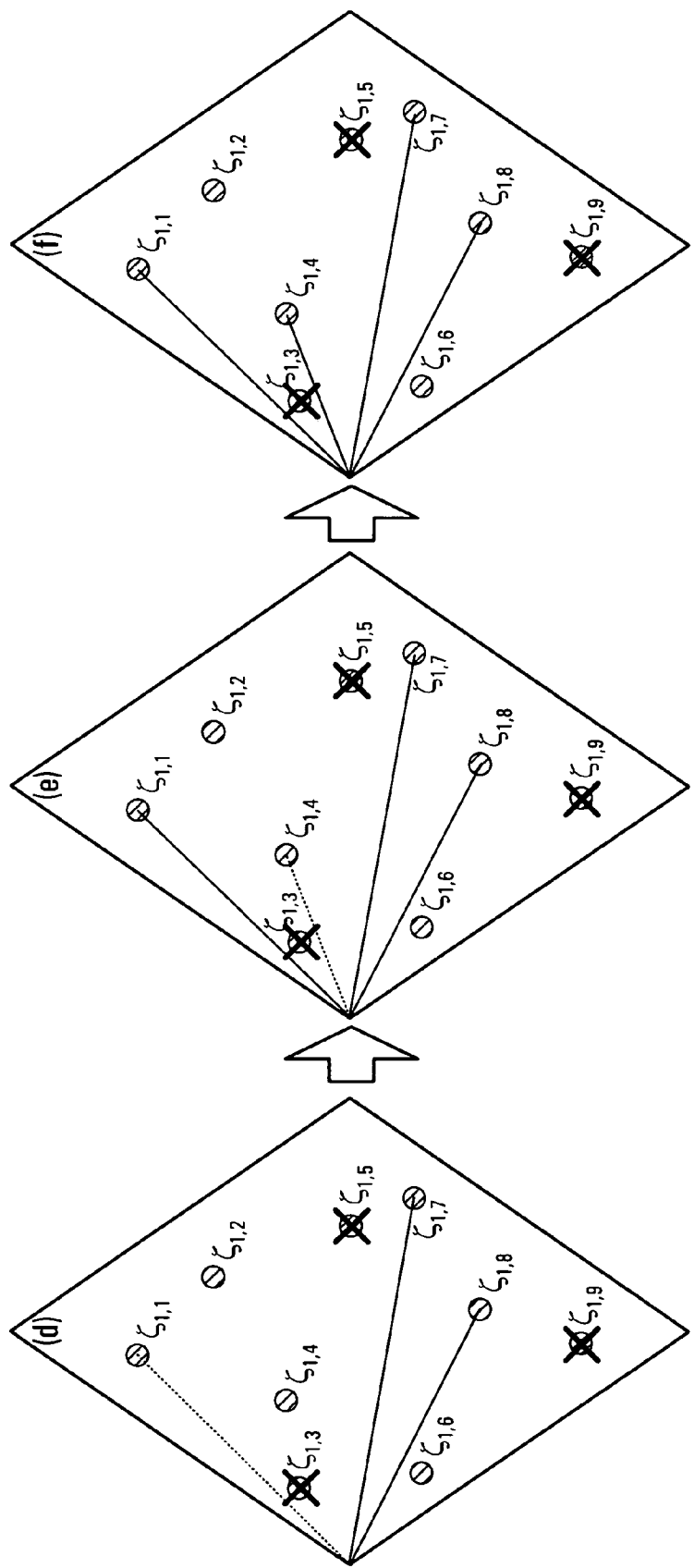

The detailed algorithm of scheduling for adaptive beamforming with an example as shown in FIGS. 10, 11 and 12 for sector-1 is described as follows:

1) Select the best sector for each LAP.

2) Define a flag to each LAP, $\xi_{i,k}$, where i and k indicate the i-th sector and the k-th LAP.

a) When $\xi_{i,k}=1$, the k-th LAP in the i-th sector is the candidate to be selected as an active LAP.

b) When $\xi_{i,k}=0$, otherwise.

3) To initialize scheduling in each time slot for both inter-sector and the intra-sector scheduling:

a) Set all flags to be 1, i.e., $\xi_{i,k}=1$.

b) Assume $\Pi_{i,k}$ to be the cumulated throughput for the k-th LAP in the i-th sector.

i) In the example, the current cumulated throughputs for all LAPs in sector-1 are sorted in order from smallest to largest as $$\Pi_{1,7}\ \Pi_{1,5}\ \Pi_{1,8}\ \Pi_{1,9}\ \Pi_{1,2}\ \Pi_{1,4}\ \Pi_{1,6}\ \Pi_{1,3}.$$

4) Inter-Sector Scheduling a) Calculate the angle of separation between two LAPs in different sectors, such as $\Delta_{1,k_2,3,k_2}$, shown in FIG. 10.

b) If $\Delta_{1,k_2,3,k_2}<\Delta_{min}$, check the cumulated throughput:

i) If $\Pi_{1,k_2}\geq\Pi_{3,k_2}$, $\xi_{1,k_2}=0$.

ii) Otherwise, $\xi_{3,k_2}=0$.

iii) In the example, we assume that $\Pi_{1,k_2}\geq\Pi_{3,k_2}$, i.e., $\xi_{1,k_2}=0$.

c) Calculate all angles of separation between LAPs and determine all LAP flags.

5) Intra-Sector Scheduling a) Separate LAPs into two groups (high priority group and low priority group) based on the cumulated throughput:

i) High priority LAPs are those LAPs having low cumulated throughputs, for example which are all smaller than a predetermined target throughput ($\Pi_{th}$). The number of high priority LAPs should be equal or smaller than the maximum number of simultaneous transmission LAPs $$N_s^{(max)}\ \ (N_H \leq N_s^{max}).$$

ii) Low priority LAPS: The remaining LAPs, which are normally larger than predetermined target throughput ($\Pi_{th}$).

iii) In the example, we assume that LAP-5, LAP-7 and LAP-8 belong to high priority group with $N_H=3$.

b) Disable M LAPs for scheduling, which have largest cumulated throughput.

i) In the example, M=1 and LAP-3 is disabled.

6) Scheduling the High Priority Group a) Select the first active LAP with flag value 1, which has lowest cumulated throughput among the LAPS in the high priority group.

i) In the example, the LAP-7 becomes an active LAP.

b) Select the next active LAP with flag value 1, which has next lowest cumulated throughput among the high priority LAP group.

c) Calculate the angle of separation between selected LAP and previous determined active LAPs.

i) In the example, the angle of separation is calculated between LAP-5 and LAP-7.

d) Compare with minimum angle of separation $\Delta_{min}$.

i) If larger than $\Delta_{min}$, the LAP becomes an active LAP.

ii) Otherwise, disable selected LAP and set its flag 0.

iii) In the example, we assume that the angle of separation is smaller than minimum value and the flag for LAP-5 equals to 0 ($\xi_{1,5}=0$).

e) Repeat steps b) to d) in step-6 until completing the high priority LAP group.

i) In the example, we calculate the minimum angles of separation for LAP-5 and LAP-8, and only LAP-8 is selected as an active LAP.

7) Scheduling the Low Priority Group.

a) Calculate the minimum angle of separation between each candidate LAP (flag=1) and previously determined active LAPs.

i) In the example, the minimum angle of separation for LAP-1 is between LAP-1 and LAP-7, for LAP-6 is between LAP-6 and LAP-8, and so on.

b) Select the LAP with maximum minimum angle of separation for active LAP.

i) In the example, LAP-1 has maximum minimum separation angle.

c) Compare this maximum minimum angle of separation with predetermined minimum angle of separation $\Delta_{min}$.

i) If larger than $\Delta_{min}$, the LAP becomes an active LAP.

ii) In the example, LAP-1 is an active LAP.

iii) If less than $\Delta_{min}$, terminate the scheduling and count the number of active LAPs, say Ns, for adaptive beamforming transmission.

d) Repeat steps a) to c) in step-7 until either the number of active LAPs reaches maximum number of simultaneous transmission LAPs $$N_s^{(max)},$$

or no candidate LAPs (all flags are 0) are left.

i) In the example, since LAP-4 has a maximum minimum angle of separation with LAP-1, LAP-7 and LAP-8, which is larger than predetermined minimum angle separation, it becomes an active LAP. LAP-6 is not selected because it fails the minimum angel constraint.

8) In the example, as a result, the selected active LAPs are LAP-1, LAP-4, LAP-6, LAP-7 and LAP-8 with Ns=5.

Any of the above described methods, when applied to scheduling of transmissions in an adaptive beamforming transmitter, may also include the further step of calculating weights for the beams that need to be generated during a given slot. Such weight calculation is well understood by one skilled in the art and will not be elaborated upon further here. In other embodiments, the methods described are applied to transmitters which do not perform adaptive beamforming.

Fixed Steering Beam Transmitter

In transmitters featuring fixed beams, there may exist a serious problem, which occurs when a receiver is located in the boundary of two beams. This results in a dead spot where the receiver cannot be served with a required minimum data rate. To deal with such a problem, in another embodiment of the invention, a transmitter is provided which generates a fixed multi-beam such as fixed 18-beam and which has the capability to steer the multi-beam through at least two incremental predetermined patterns (each offset by a small angle from each other) to find the best direction in terms of beam number and steering number for each receiver based on the received SNR.

Figure 1:
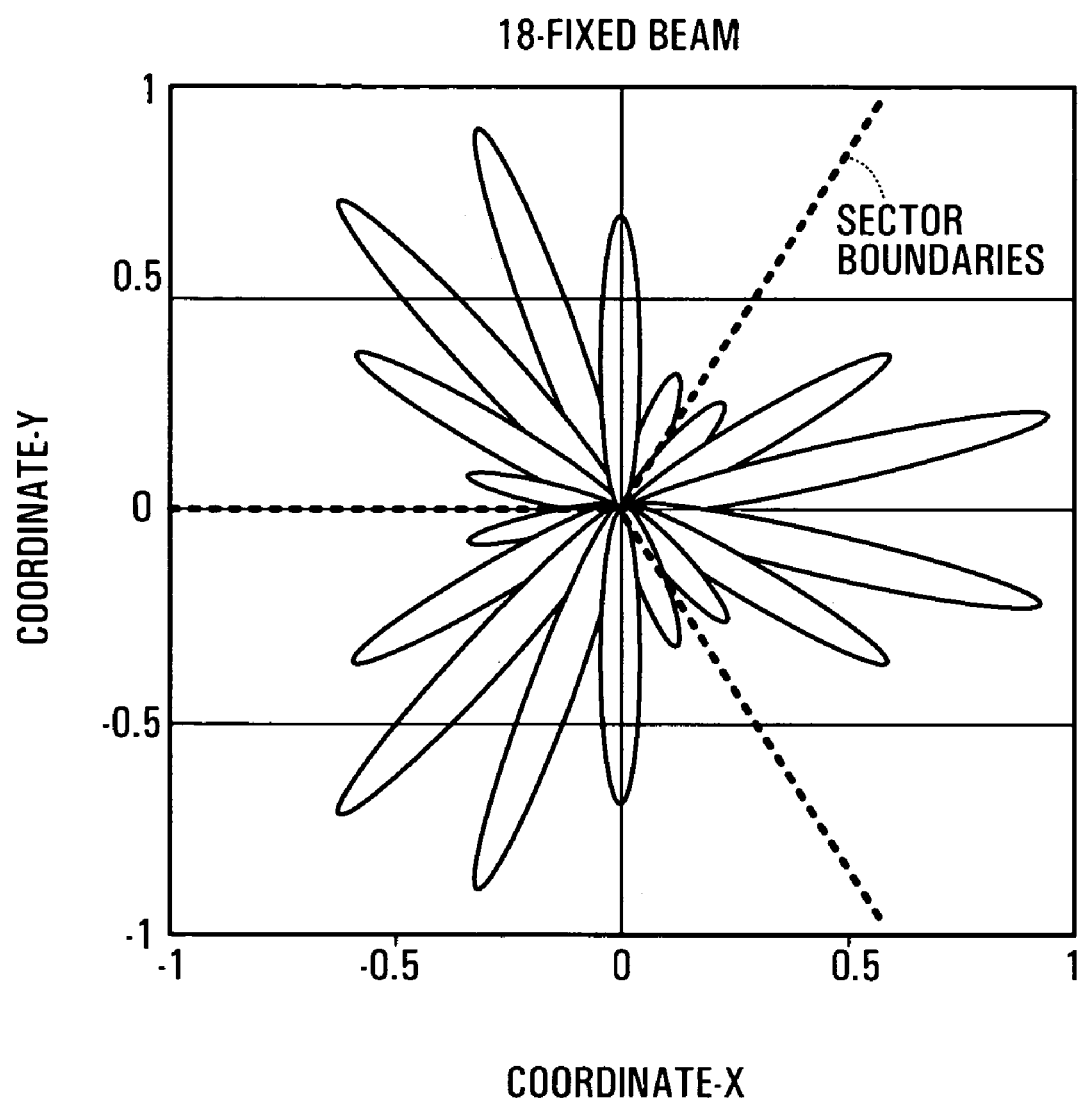
FIG. 1 is an example plot of a conventional fixed beam layout.
Figure 2:
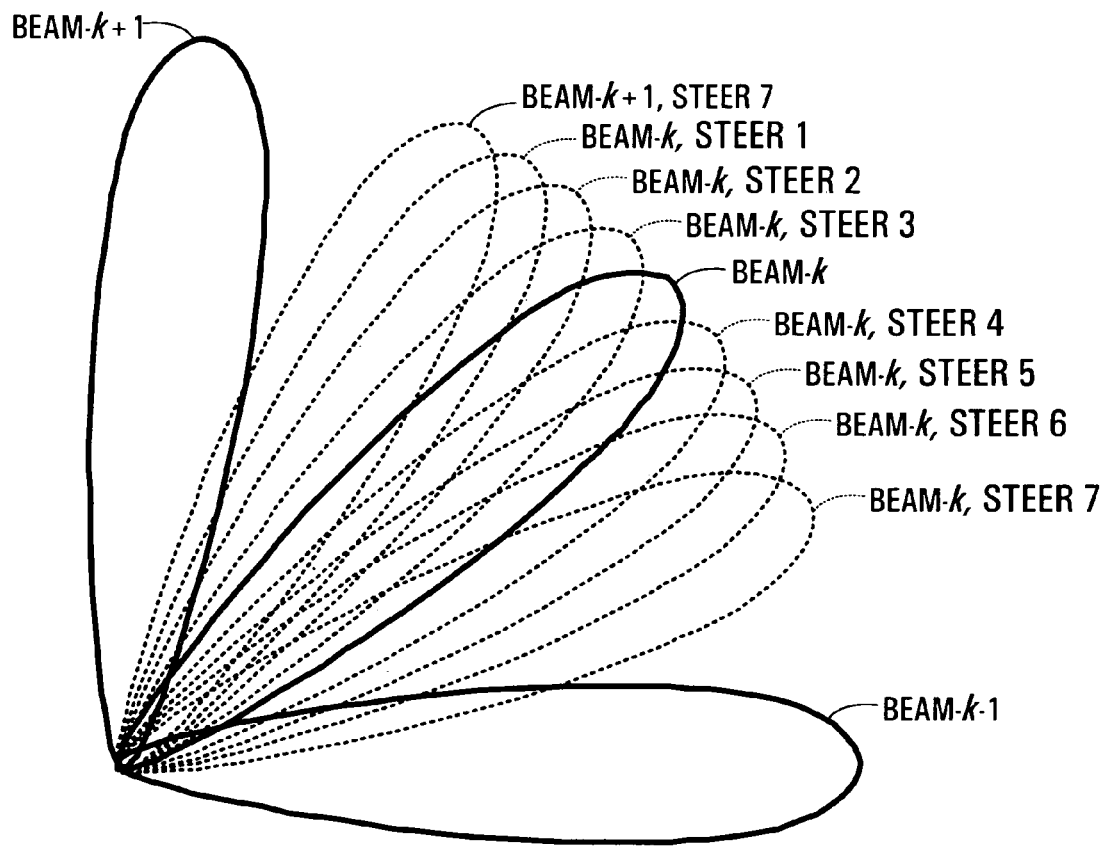
FIG. 2 is an example plot of a steering beam layout provided by an embodiment of the invention.
Figure 3:
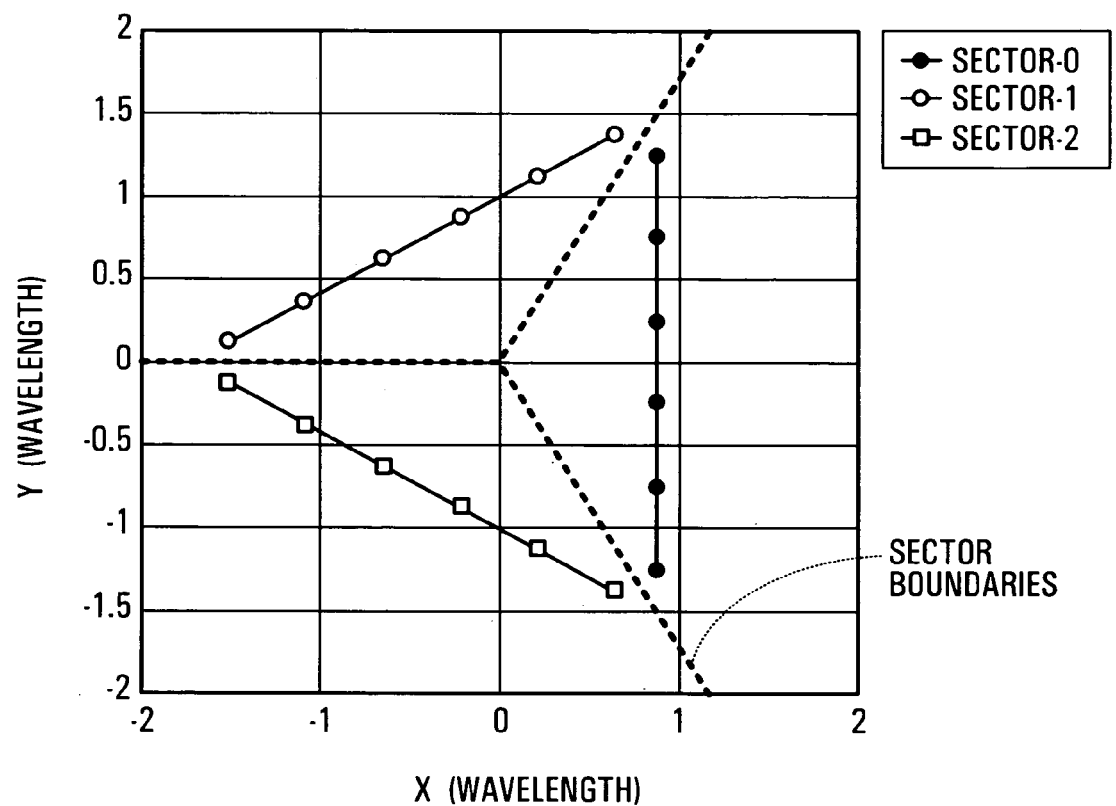
FIG. 3 is a schematic of a conventional triangular array structure having six elements per sector.

In this embodiment, a fixed beamset such as fixed 18-beam shown in FIG. 1 is employed together with a steering capability which enables the beams to be steered to several predetermined patterns (a small angle) to find the best direction in terms of beam number and steering number. If it is assumed that the number of steering patterns is N and range of steering is 360/M degrees, the small angle for each steering becomes 360/(NM) degrees, where M is the number of beams. FIG. 2 illustrates the k-th steering beam with eight steering patterns.

There are two parameters are determined for each user; one is the fixed multi-beam number with the range of 0 to M−1, and the other is the steering pattern number with the range of 0 to N−1. These two parameters are determined based on the highest received SNR over all fixed beams and steering patterns.

Advantageously, the fixed steering beam transmission method provides a high SNR to the users even who are located in the boundary of two adjacent fixed beams. This also increases the space dimension up to NM so as to increase the number of simultaneous transmission users. The solution also has a low computational complexity as opposed to adaptive beamforming. This is because the adaptive beamforming weights used to form the beams are typically calculated by inverting a matrix every slot once the active users are changed so as to minimize the side-lobe interference between active users. The fixed beam used for steering beam transmission, however, is pre-designed in hardware and so does not need such a calculation. The fixed steering beam approach may cooperate with different types of schedulers and provide the same flexibility as adaptive beamforming does.

In a preferred embodiment, the fixed steering beam transmission approach is used in conjunction with the previously described scheduling methods which perform scheduling based on angle of separation. In this case, for each slot a particular position for the steering beam is selected, and a subset of the users are scheduled which can be served using that position.

Individually Steerable Fixed Beam Transmitter

In another embodiment, the scheduling methods described herein are applied to a transmitter which transmits individual fixed beam which are each steerable for transmission. This differs from adaptive beam forming in that the beams are not generated as a set, but rather are individually generated. The method is the same as for the adaptive beam forming embodiments. However, it may be desirable to have a larger minimum angle of separation for this embodiment as there may be more interference between adjacent beams.

Numerous modifications and variations of the present invention are possible in light of the above teachings. It is therefore to be understood that within the scope of the appended claims, the invention may be practised otherwise than as specifically described herein.

We claim:

1. A method of scheduling transmissions from a multi-beam transmitter to a plurality of receivers comprising:

determining an angle of departure for each of the plurality of receivers;

scheduling transmission to receivers based upon separation between angles of departure between scheduled receivers, wherein a minimum angle of separation constraint is imposed that requires any two receivers which are scheduled during a given scheduling interval to have angles of departure separated by at least a first minimum angle of separation;

wherein the scheduling transmission to the receivers comprises:

a) scheduling a first receiver;

b) determining a receiver of remaining receivers which has a largest angle of separation with previously scheduled receivers and scheduling that receiver subject to the constraint.

2. A method according to claim 1 further comprising for each scheduling interval:

logically dividing the receivers into low priority receivers and high priority receivers;

wherein scheduling transmission to the receivers further comprises scheduling the high priority receivers before scheduling the low priority receivers.

3. A method according to claim 1 further comprising for each scheduling interval:

logically dividing the receivers according to at least three groups each having a respective priority ranging from lowest to highest;

wherein scheduling transmission to the receivers further comprises scheduling the groups of receivers in decreasing order of priority.

4. A method of scheduling transmissions from a multi-beam transmitter to a plurality of receivers, the method comprising:

determining an angle of departure for each of the plurality of receivers;

scheduling transmission to receivers based upon separation between angles of departure between scheduled receivers, wherein a minimum angle of separation constraint is imposed that requires any two receivers which are scheduled during a given scheduling interval to have angles of departure separated by at least a first minimum angle of separation;

wherein scheduling transmission to receivers comprises for each scheduling interval:

logically dividing the receivers into low priority receivers and high priority receivers, and scheduling the high priority receivers before scheduling the low priority receivers;

wherein scheduling the high priority receivers comprises:
  a) determining a high priority receiver with a poorest performance metric and scheduling that receiver;
  b) determining a high priority receiver with a next poorest performance metric and scheduling that high priority receiver unless that high priority receiver has a minimum angle of separation with a previously scheduled receiver which does not satisfy the constraint; and wherein scheduling the low priority receivers comprises:
  c) determining a low priority receiver which has a largest angle of separation with previously scheduled receivers and scheduling that user subject to the constraint.

5. A method according to claim 4 further comprising repeating step b) until there are no further high priority receivers that satisfy the constraints.

6. A method according to claim 5 further comprising repeating d) for further low priority receivers until no further low priority receiver satisfies the constraint or until there is no further capacity to schedule.

7. A method according to claim 1 applied to each of a plurality of sectors being serviced by a wireless network node.

8. A method according to claim 7 wherein the wireless network node is a network access point, and each receiver is a local access point.

9. A method according to claim 7 further comprising:
determining if there is any pair of receivers of different sectors which have angles of departure separated by less than a second minimum angle of separation;

for each such pair of receivers, eliminating one of the pair of receivers from consideration for scheduling.

10. A method according to claim 9 wherein the one of the pair of receivers eliminated from consideration is selected on the basis of cumulative throughput, with the receiver having higher cumulative throughput being eliminated.

11. A method according to claim 1 further comprising:
at a beginning of scheduling for each scheduling interval, eliminating at least one receiver from consideration for scheduling.

12. A method according to claim 4 applied to each of a plurality of sectors being serviced by a wireless network node, wherein the performance metric comprises cumulative throughput, the method further comprising:

determining if there is any pair of receivers of different sectors which have angles of departure separated by less than a second minimum angle of separation;

for each such pair of users, eliminating one of the pair of receivers from consideration for scheduling on the basis of cumulative throughput, with the higher cumulative throughput receiver of the pair being eliminated.

13. A method according to claim 1 wherein the multi-beam transmitter comprises an adaptive beamforming transmitter, the method further comprising performing adaptive beamforming for the scheduled receivers.

14. A method according to claim 1 wherein the multi-beam transmitter generates a plurality of substantially fixed beams which are individually directable, the method further comprising directing each of the substantially fixed beams.

15. A method according to claim 1 wherein the multi-beam transmitter is a fixed multi-beam transmitter which generates an array of beams which are collectively steerable to a plurality of fixed rotational states, and individually activatable.

16. A transmitter adapted to implement a method according to claim 1.

17. A transmitter according to claim 16 in the form of a network access point.

18. A system comprising:
a wireless network node adapted to implement a method according to claim 1;
a plurality of receivers.

19. A system according to claim 18 wherein the wireless network node is a network access point, and each receiver is a local access point.

20. A computer readable medium having computer readable instructions encoded thereon for implementing a method according to claim 1.

21. A transmitter comprising:
a multi-beam antenna;
a scheduler adapted to determine an angle of departure for each of a plurality of receivers and to schedule transmission to each receiver on an appropriate beam of the multi-beam antenna based upon separation between angles of departure between scheduled receivers;

wherein a minimum angle of separation constraint is imposed that requires any two receivers which are scheduled during a given scheduling interval to have angles of departure separated by at least a first minimum angle of separation;

wherein the scheduler is adapted to schedule transmission to each receiver by
  a) scheduling a first receiver; and
  b) determining a receiver of remaining receivers which has a largest angle of separation with previously scheduled receivers and scheduling that receiver subject to the constraint.

22. A transmitter according to claim 21 wherein the scheduler is adapted to determine an angle of departure for each receiver by receiving an angle of arrival information from each receiver, and deriving the angle of departure from the angle of arrival information.

23. A transmitter according to claim 21 wherein the multi-beam antenna is an adaptive beamforming antenna.

24. A transmitter according to claim 21 wherein the multi-beam antenna is a fixed steering beam antenna.

25. A transmitter according to claim 21 wherein the multi-beam antenna generates a plurality of beams having substantially fixed shapes which are individually directable.

26. A transmitter according to claim 21 in the form of a network access point.

* * * * *